United States Patent [19]

Rieck et al.

[11] Patent Number: 4,528,172
[45] Date of Patent: Jul. 9, 1985

[54] PROCESS FOR THE MANUFACTURE OF ZEOLITES

[75] Inventors: Hans-Peter Rieck; Hans-Jürgen Kalz, both of Hofheim am Taunus, Fed. Rep. of Germany

[73] Assignee: Hoechst Aktiengesellschaft, Fed. Rep. of Germany

[21] Appl. No.: 540,822

[22] Filed: Oct. 11, 1983

[30] Foreign Application Priority Data

Oct. 13, 1982 [DE] Fed. Rep. of Germany ....... 3237916

[51] Int. Cl.³ .............................................. C01B 33/28
[52] U.S. Cl. .................................... 423/329; 423/332; 423/335
[58] Field of Search .............................. 423/328–330, 423/306, 305, 332, 335, 326; 502/60, 77, 208, 62

[56] References Cited

U.S. PATENT DOCUMENTS

| 3,709,979 | 1/1973 | Chu | 423/328 |
| 4,060,590 | 11/1977 | Whittam et al. | 423/328 |
| 4,151,189 | 4/1979 | Rubin et al. | 423/329 X |
| 4,229,424 | 10/1980 | Kokotailo | 423/328 |
| 4,287,166 | 9/1981 | Dwyer et al. | 423/325 |

FOREIGN PATENT DOCUMENTS 1365318  8/1974  United Kingdom ............... 423/329

OTHER PUBLICATIONS

Lok et al., "Zeolites", 1983, vol. 3, Oct., pp. 282–291.

Primary Examiner—Edward J. Meros
Attorney, Agent, or Firm—Connolly and Hutz

[57] ABSTRACT

The invention provides a process for the manufacture of zeolites of the ZSM-5 type by heating an aqueous solution or suspension containing a silicon dioxide source, alkali metal hydroxide and optionally an aluminum source until crystallization occurs. Furthermore, the solution or suspension contains an organic phosphorus compound which is selected from the group consisting of $OPR^1R^2R^3$ and $PR^1R^2R^3$, in which $R^1$, $R^2$ and $R^3$, independently from one another, each are alkyl or alkoxy having each from 2 to 10 carbon atoms.

9 Claims, No Drawings

PROCESS FOR THE MANUFACTURE OF ZEOLITES

The invention provides a process for the manufacture of synthetic, crystalline aluminosilicate zeolites rich in silicate corresponding to the ZSM-5 type (by "zeolites of the ZSM-5 type" there is to be understood also the ZSM-11 zeolite in this case).

Various zeolites have gained a great technological importance due to the fact that they can be applied as ion exchangers, molecular sieves and catalysts. Recently, there is an increased interest in zeolites of the ZSM-5 type, because they have excellent catalytic activity in various alkylations and isomerizations, and catalyze the conversion of methanol to saturated hydrocarbons, olefins and aromatic substances.

For the preparation of the zeolites ZSM-5 and ZSM-11, generally nitrogen-containing organic cations, especially tetralkylammonium cations (U.S. Pat. Nos. 3,702,886 and 3,709,979) are used. Furthermore, it is known that the zeolite ZSM-11 may be prepared in the presence of tetraalkylammonium cations (U.S. Pat. No. 3,709,979).

Since quaternary ammonium salts, especially quaternary phosphonium salts, are obtainable with difficulty only in many cases and are very expensive, it is the object of the invention to provide a process for the manufacture of zeolites of the ZSM-5 type for which easily obtainable compounds can be applied.

This object is achieved in accordance with the invention by using special nonionic phosphorus compounds instead of the known organic phosphonium salts.

There has been found a process for the manufacture of zeolites of the ZSM-5 type rich in silicate by heating an aqueous solution or suspension containing a silicon dioxide source, an organic phosphorus compound, alkali metal hydroxide and optionally an aluminum oxide source until crystallization occurs, wherein the organic phosphorus compound is selected from the group consisting of $OPR^1R^2R^3$ and $PR^1R^2R^3$ in which $R^1$, $R^2$ and $R^3$, independently from one another, each are alkyl or alkoxy having each from 2 to 10 carbon atoms.

The $SiO_2$ source may be active silicic acid such as pyrogenic or colloidal silicic acid. Other suitable $SiO_2$ sources are known from Published European Patent Application No. 54,386. Generally, the cheap water glass is preferred.

Alkali metal hydroxide may be used in free form or in form of the alkali metal oxide portion of the water glass added, or of alkali metal aluminate. Other salts of alkaline reaction, such as alkali metal carbonate, may alternatively be added. Among the alkali metal compounds, the sodium compounds are preferred. Preferably, the pH of the aqueous solution or suspension is in the range of from 8 to 12. For adjusting the pH, an acid, for example sulfuric or phosphoric acid can be added to the reaction batch. In the case of a low molecular ratio $OH^{(-)}/SiO_2$, the reaction time is reduced, but there is the risk of amorphous portions occurring.

The zeolites manufactured according to the process of the invention need not necessarily contain aluminum. Small amounts of aluminum may however occur in the zeolites without adding aluminum sources when starting from industrial grade water glass contaminated with aluminum. In the case where a large amount of aluminum is intended, an aluminum compound such as freshly precipitated aluminum hydroxide, sodium aluminate or aluminum sulfate, can be added to the reaction batch.

In most cases, in the process of the invention, a reaction mixture is prepared which has the following molar composition:

$Al_2O_3/SiO_2$: 0–0.05, preferably 0.002–0.04, especially 0.004–0.025

Alkali metal oxide/$SiO_2$: 0.001–1, preferably 0.01–0.5

$H_2O/SiO_2$: 5–200, preferably 15–80 org. phosphorus compound/$SiO_2$: 0.005–1, preferably 0.01–0.5, especially 0.02–0.4.

The zeolite rich in silicate of the ZSM-5 type manufactured according to the process of the invention has an atomic ratio Al:Si of 0 to 0.1. The X-ray diffraction pattern shows reflections of at lest medium intensity at d-values of $11.2\pm0.5$; $10.0\pm0.5$; $3.9\pm0.05$; $3.8\pm0.05$; $3.75\pm0.05$; $3.70\pm0.05$.

In addition to aluminum, some other elements such as boron, indium, gallium, arsenic, antimony, and elements of the 1st to 8th subgroup of the Periodic Table such as zirconium, vanadium, iron or chromium can be incorporated into the zeolite lattice. The quantity of metal incorporated into the zeolite may amount to up to about 25 weight %. Small amounts of these elements do not substantially after the crystal structure of the zeolite.

Advantageously, the organic phosphorus compound in the process of the invention contains at least one $C_2$–$C_{20}$-alkyl group, preferably three of them. Preferably, phosphorus compounds having $C_2$–$C_4$-alkyl and/or $C_2$–$C_4$-alkoxy radicals are used.

As phosphorus compounds of the OP $R^1R^2R^3$ or PR$^1R^2R^3$ type compounds may be used in which $R^1$, $R^2$ and $R^3$ are different, but preferred are the compounds having three identical groups, which are more easily obtainable, for example tripropylphosphine, tributylphosphine or tributylphosphine oxide. These compounds are especially suitable for synthesis, furthermore tributyl phosphate or long-chain compounds such as trioctylphosphine oxide. Those phosphorus compounds are preferred for the process of the invention which belong to the group of trialkylphosphines, trialkylphosphine oxides, alkyl esters of phosphinic, phosphonic or phosphoric acid.

The zeolites obtained in the process of the invention still contain part of the organic phosphorus compound occluded in the crystal lattice. In order to increase the catalytic reactivity of the zeolite, the organic phosphorus compound must be destroyed, for which purpose the zeolite is heated for 1 to 2 hours at about 500°–600° C., optionally in the presence of oxygen. Subsequently, the alkali metal ion of the zeolite is replaced by an ammonium ion or doping elements, for example from the 1st to 8th subgroup. When thus the ammonium form of the zeolite is prepared, the ammonium ion therein can be destroyed by a second calcination (with or without oxygen). Thus, a zeolite in H form is obtained which is particularly suitable for catalytic application.

In the process of the invention, the reaction temperature is in most cases from 100° to 200° C., preferably 150° to 200° C. The reaction is carried out hydrothermally under pressure which establishes itself over the reaction mixture. The reaction time is chosen in such a manner that a crystalline zeolite is formed. Sometimes, this takes a few hours only; on the other hand, several days may be required.

The zeolites manufactured according to the process of the invention have the properties of molecular sieves and can therefore be applied for adsorptions. They are furthermore suitable as catalysts for example for crack or hydrocrack processes, isomerization reactions, alkylations, and the conversion of methanol.

The following examples illustrate the invention.

EXAMPLE 1

The reaction mixture had the following molar composition: $0.303Na_2O:=0.0052Al_2O_3:SiO_2:41.2H_2O:0.060P_2O_5:0.1PR^1R^2R^3$.

It is prepared by adding at first 222.56 g of industrial grade water glass (27% $SiO_2$, 8.43% $Na_2O$, 0.24% $Al_2O_3$) to water. Subsequently, 20.2 g of tributylphosphine and 13.89 g of phosphoric acid (85% strength) are added. The reaction mixture is stirred for 5 hours at 180° C. in a stainless steel autoclave (volume 2 liters) under autogeneous pressure. After cooling, the reaction mixture is filtered, washed with water and dried for 2 hours at 170° C. The product has the X-ray pattern of Table 1. The zeolite has the following molar composition: $0.0079Al_2O_3:0.012Na_2O:SiO_2$. After calcination for 2 hours at 550° C. in air, the substance has the X-ray diffraction pattern of Table 2.

EXAMPLE 2

The reaction mixture has the following composition: $0.303Na_2O:0.0052Al_2O_3:SiO_2:40.9H_2O:0.1PR^1R^2R^3$
The mixture of water and water glass is prepared precisely as indicated in Example 1. Thereafter, 20.2 g of tributylphosphine are added. The reaction mixture is stirred for 21 hours at 160° C. in a stainless steel autoclave (volume 2 liters) under autogenous pressure. The further work-up is as described in Example 1. The X-ray diffraction pattern proves the ZSM-5 like structure of the zeolite obtained (pattern very similar to that of Table 1).

EXAMPLE 3

The reaction mixture has the following molar composition: $0.303Na_2O:0.0052Al_2O_3:SiO_2:41.2H_2O:0.060P_2O_5:0.1PR^1R^2R^3$ The mixture of water and water glass is prepared as described in Example 1. Subsequently, 17.6 g of tripropylphosphine oxide and 13.89 g of phosphoric acid (85%) are added. The reaction mixture is stirred for 21 hours at 160° C. in a stainless steel autoclave under autogenous pressure and worked up as described in Example 1. The X-ray diffraction pattern proves the ZSM-5-like structure of the product.

EXAMPLE 4

The reaction is carried out as described in Example 3. Instead of the tripropylphosphine oxide, 16.0 g of tripropylphosphine are added. The X-ray diffraction pattern proves the ZSM-5-like structure of the product.

EXAMPLE 5

The reaction is carried out as described in Example 3. Instead of the tripropylphosphine oxide, 22.5 g of tributylphosphine oxide are used. The X-ray diffraction pattern proves the ZSM-like structure of the product.

EXAMPLE 6

The reaction is carried out as described in Example 1. Only the reaction time is reduced to 2 hours at 180° C. The X-ray diffraction pattern shows a ZSM-5-like structure and 95% of crystallinity (relative to the 100% of the product of Example 1). The content of crystalline ZSM-5-like material is determined by the ratio of intensity of the X-ray reflection at an interplanar spacing d of $3.87 \times 10^{-8}$ cm relative to the corresponding reflection in Example 1.

EXAMPLE 7

The reaction is carried out as described in Example 1. The reaction time is 1 hour at 208° C. The X-ray diffraction pattern proves a ZSM-5-like structure the crystallinity of which is reduced to about 67%, as compared to Example 1.

EXAMPLES 8 TO 10

The reactions are carried out as described in Example 1; reaction time and amount of phosphorus compound, however, being altered.
8. $PR^1R^2R^3:SiO_2=0.05$; 2 h 177° C.; zeolite obtained: 100% ZSM-5-like
9. $PR^1R^2R^3:SiO_2=0.02$; 2 h 180° C.; zeolite obtained: 38% ZSM-5-like + amorphous
10. $PR^1R^2R^3:SiO_2=0.01$; 2 h 177° C.; zeolite obtained: 35% ZSM-5-like + amorphous

EXAMPLE 11

The reaction mixture has the following molar composition: $0.303Na_2O:0.0052Al_2O_3:SiO_2:41.2H_2O:0.060P_2O_5:0.1PR^1R^2R^3$.

The mixture of water and water glass is prepared as indicated in Example 1. Subsequently, 26.6 g of tributyl phosphate and 13.89 g of phosphoric acid (85% strength) are added. The reaction mixture is stirred for 2.5 hours at 175° C. in a stainless steel autoclave under autogenous pressure, and worked up as described in Example 1. The X-ray diffraction pattern proves a ZSM-5-like structure the crystallinity of which is reduced to about 26%, as compared to Example 1.

EXAMPLE 12

The reaction is carried out as described in Example 11. The reaction time is 6 hours. The crystallinity is about 38%.

EXAMPLE 13

The reaction mixture has the following molar composition: $0.030Na_2O:0.0252Al_2O_3:SiO_2:41.6H_2O:0.06SO_3:0.060P_2O_5:0.046PR^1R^2R^3$ The mixture of water and water glass is prepared as indicated in Example 11. Subsequently, 10.0 g of tributylphosphine oxide, 13.33 g $Al_2(SO_4)_3.18H_2O$ and 13.89 g of phosphoric acid (85%) are added. The reaction mixture is stirred for 3 hours at 175° C. in a stainless steel autoclave under autogenous pressure, and worked up as described in Example 1. The X-ray diffraction pattern proves a ZSM-5-like structure (74% of the intensity of the product of Example 1) of the product, and a small amount of mordenite as by-product.

TABLE 1

| Interplanar spacing/relative intensity | |
|---|---|
| d ($10^{-8}$ cm) | (100 $I/I_o$) |
| 11.18 | 46 |
| 10.07 | 39 |
| 9.96 | 39 |
| 9.77 | 14 |
| 9.02 | 2 |
| 7.50 | 4 |
| 6.76 | 5 |
| 6.39 | 9 |
| 6.02 | 9 |
| 5.73 | 10 |
| 5.61 | 8 |
| 5.39 | 3 |

TABLE 1-continued

| Interplanar spacing/relative intensity | |
|---|---|
| d ($10^{-8}$ cm) | (100 $I/I_o$) |
| 5.15 | 3 |
| 5.05 | 3 |
| 5.01 | 6 |
| 4.65 | 8 |
| 4.57 | 3 |
| 4.46 | 3 |
| 4.37 | 12 |
| 4.27 | 13 |
| 4.10 | 4 |
| 4.02 | 9 |
| 3.87 | 100 |
| 3.82 | 80 |
| 3.75 | 44 |
| 3.72 | 49 |
| 3.66 | 18 |
| 3.65 | 18 |
| 3.49 | 5 |
| 3.45 | 12 |
| 3.36 | 6 |
| 3.32 | 10 |
| 3.25 | 4 |
| 3.06 | 9 |
| 3.00 | 11 |
| 2.96 | 7 |
| 2.94 | 3 |
| 2.87 | 3 |
| 2.74 | 5 |
| 2.61 | 4 |
| 2.56 | 2 |
| 2.52 | 3 |
| 2.49 | 5 |
| 2.40 | 4 |
| 2.02 | 11 |
| 2.00 | 16 |

TABLE 2

| Interplanar spacing/relative intensity | |
|---|---|
| d ($10^{-8}$ cm) | (100 $I/I_o$) |
| 11.19 | 100 |
| 10.10 | 64 |
| 9.82 | 22 |
| 9.02 | 3 |
| 7.47 | 2 |
| 6.73 | 9 |
| 6.39 | 15 |
| 6.02 | 25 |
| 5.75 | 14 |
| 5.61 | 15 |
| 5.39 | 4 |
| 5.17 | 3 |
| 5.05 | 8 |
| 5.01 | 11 |
| 4.63 | 7 |
| 4.48 | 3 |
| 4.37 | 10 |
| 4.27 | 15 |
| 4.09 | 5 |
| 4.02 | 9 |
| 3.87 | 86 |

TABLE 2-continued

| Interplanar spacing/relative intensity | |
|---|---|
| d ($10^{-8}$ cm) | (100 $I/I_o$) |
| 3.83 | 60 |
| 3.75 | 32 |
| 3.72 | 40 |
| 3.66 | 19 |
| 3.50 | 5 |
| 3.45 | 11 |
| 3.41 | 4 |
| 3.36 | 7 |
| 3.31 | 11 |
| 3.25 | 5 |
| 3.19 | 2 |
| 3.15 | 3 |
| 3.06 | 9 |
| 3.05 | 9 |
| 3.00 | 17 |
| 2.96 | 9 |
| 2.87 | 3 |
| 2.74 | 5 |
| 2.61 | 4 |
| 2.60 | 2 |
| 2.56 | 2 |
| 2.52 | 3 |
| 2.49 | 5 |
| 2.42 | 3 |
| 2.40 | 3 |
| 2.02 | 11 |
| 2.00 | 11 |

What is claimed is:

1. A process for the manufacture of zeolites of the ZSM-5 type by heating an aqueous solution or suspension containing a silicon dioxide source, an organic phosphorus compound, and alkali metal hydroxide until crystallization occurs, wherein the organic phosphorus compound has the formula $OPR^1R^2R^3$, of which $R^1$, $R^2$, and $R^3$, independently from one another, each are alkyl or alkoxy having each from 2 to 10 carbon atoms.

2. The process as claimed in claim 1, wherein the organic phosphorus compound is tripropylphosphine oxide or tributylphosphine oxide.

3. The process as claimed in claim 1 wherein sodium hydroxide is used as alkali metal hydroxide.

4. The process as claimed in claim 1, wherein an alkali metal silicate is used as the silicon dioxide source.

5. The process as claimed in claim 1, wherein the radical $R^1$ is a $C_2$-$C_{10}$-alkyl group.

6. The process as claimed in claim 5, wherein $R^2$ and $R^3$, independently from each other, are $C_2$-$C_{10}$-alkyl groups.

7. The process as claimed in claim 1, wherein $R^1$, $R^2$, and $R^3$, independently from one another, are alkyl or alkoxy radicals each having from 2 to 4 carbon atoms.

8. The process as claimed in claim 1, wherein the aqueous solution or suspension to be heated has a pH of from 8 to 12.

9. A process as claimed in claim 1, wherein said aqueous solution or suspension additionally contains an aluminum oxide source.

* * * * *